Patented Aug. 22, 1933

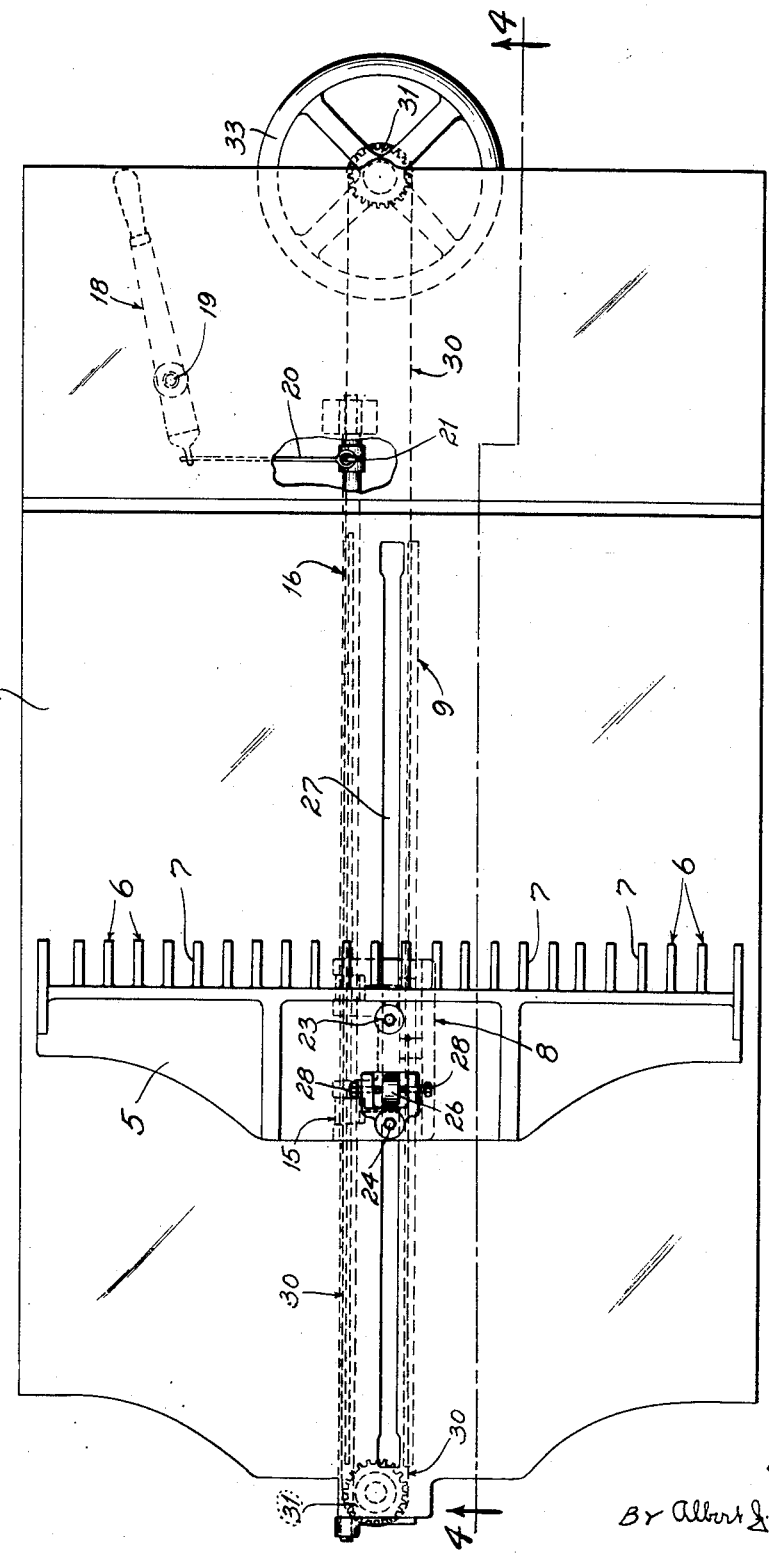

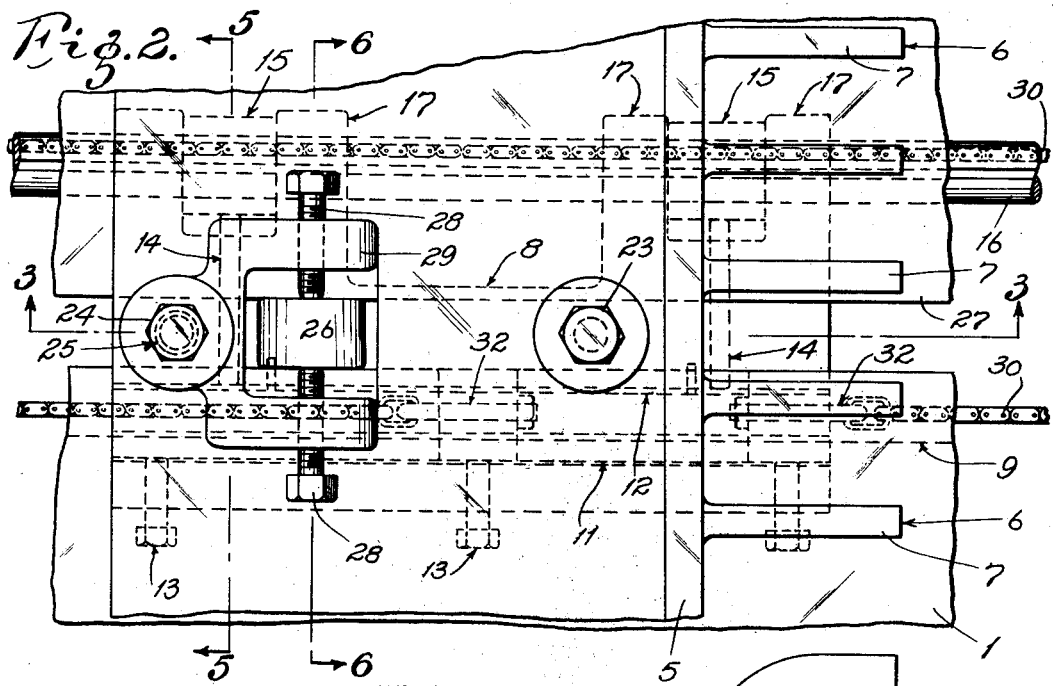
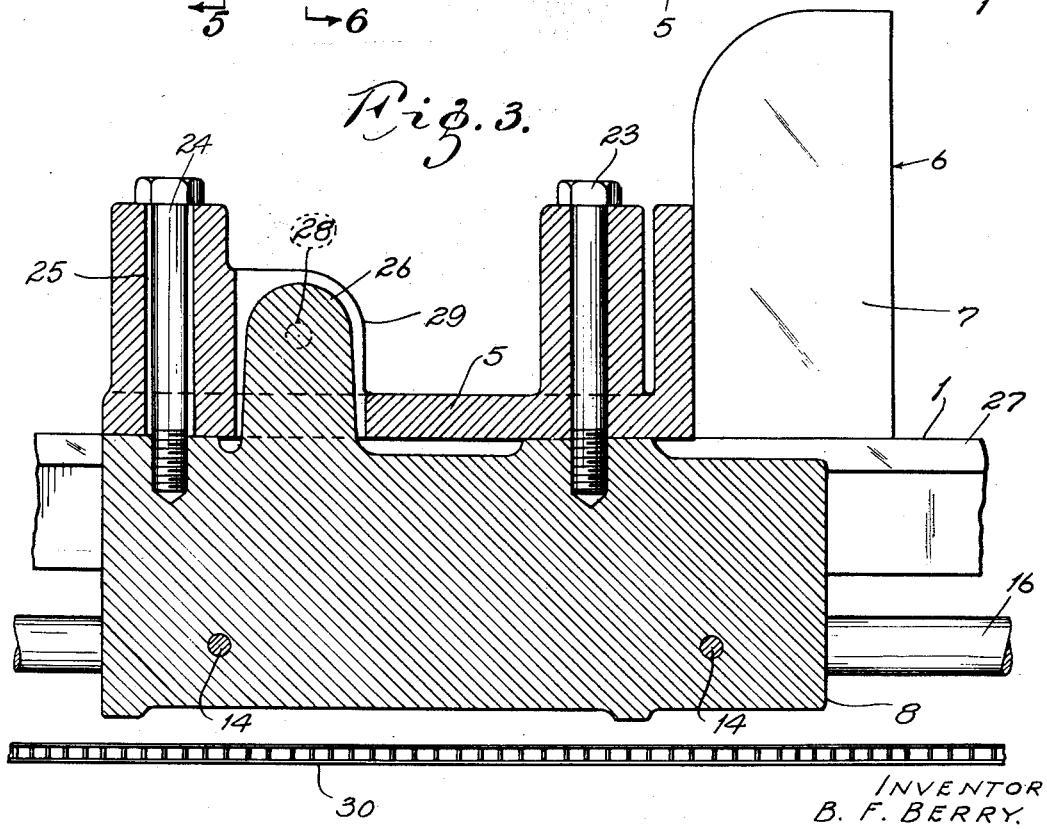

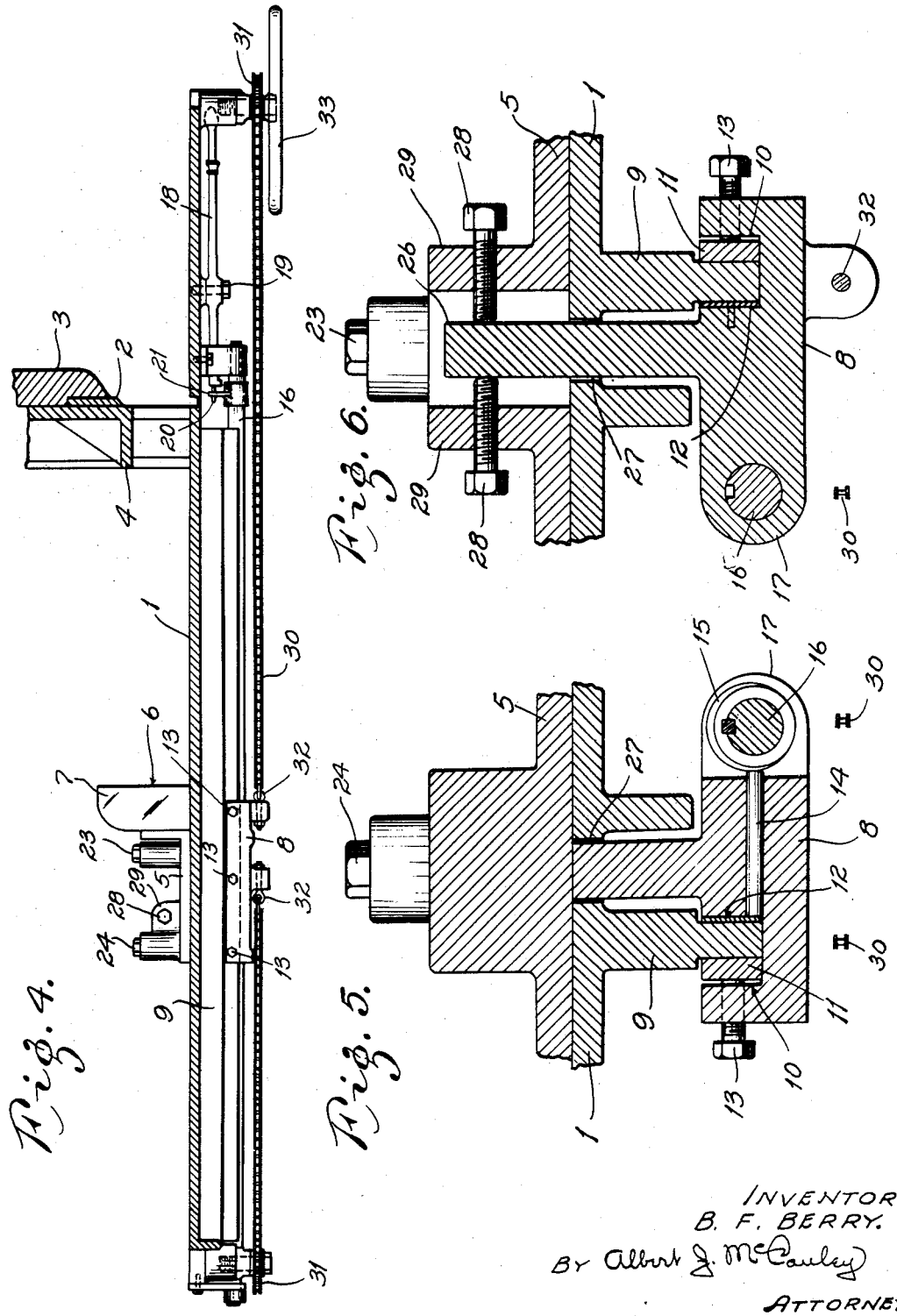

1,923,293

UNITED STATES PATENT OFFICE 1,923,293

GAUGE FOR CUTTING MACHINES

Benjamin F. Berry, St. Louis, Mo., assignor to Berry Machine Company, St. Louis, Mo., a Corporation of Missouri Application September 23, 1927
Serial No. 221,448

3 Claims. (Cl. 164—59)

This invention relates to gauges for cutting machines, and the invention is especially useful in connection with a gauge having an abutment face to engage the material to be cut. One of the objects is to accurately locate the abutment face in a predetermined position relative to the cutter.

Prior to this invention, paper cutters have been provided with gauges including an adjustable abutment provided with an abutment face intended to lie parallel with the cutter, and such adjustable abutments have been guided in approximately straight lines, but in actual practice there must be more or less looseness between an adjustable member and its guide. As a consequence, the contact between an adjustable abutment member and its guide has not been firm enough to accurately locate the abutment face in a line parallel with the cutter.

In the preferred form of my invention, a guide is used to direct the adjustable abutment member toward and away from the cutter, but after the abutment has been shifted, it is clamped to a straight face of the guide, thereby eliminating the looseness, and accurately locating the abutment face in a line parallel with the cutter.

With the foregoing and other objects in view, the invention comprises the novel method, construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a top view of a cutting table equipped with a gauge embodying the features of this invention.

Fig. 2 is an enlarged fragmentary top view showing a means whereby the abutment member may be adjustably secured to a carrier which lies beneath the table.

Fig. 3 is a section on the line 3—3 in Fig. 2.

Fig. 4 is a section on the line 4—4 in Fig. 1, showing the abutment above the table and the carrier below the table.

Fig. 5 is a section on the line 5—5 in Fig. 2, showing a means for clamping the carrier to the guide.

Fig. 6 is a section on the line 6—6 in Fig. 2, showing a means to adjust the abutment relative to the carrier.

To illustrate one form of the invention, I have shown a table 1 having a horizontal top face, a cutter 2 (Fig. 4) in the form of a knife mounted in a holder 3 adapted to be moved toward and away from the top of the table. A clamping member 4 (Fig. 4) located above the table, is also movable downwardly to clamp the paper during the cutting operation.

The adjustable gauge comprises an abutment member 5 mounted on the top of the table and having an abutment face 6 to contact with the material to be cut. This abutment face 6 is intended to lie parallel with the cutter during the cutting operation, but said abutment face may be formed by a series of wings 7 (Fig. 1) having outer edges which contact with a pile of paper sheets (not shown) on the table 1.

The adjustable gauge also includes a carrier 8 located below the table and secured to the abutment member 5 as will be hereafter described.

The carrier 8 can be moved along a guide 9 for the purpose of adjusting the abutment member 5 toward and away from the cutter, and this guide 9 is preferably in the form of a long rib cast integral with and extending downwardly from the bottom of the table 1.

The carrier 8 is provided with a recess 10 (Figures 5 and 6) to receive the lower margin of the guide 9. Both sides of this lower margin are accurately machined to lie in straight lines at a right angle to the cutter. The carrier includes straight alining bars 11 and 12 located at opposite sides of the finished lower margin of the guide 9, and adapted to firmly engage the finished faces of this guide. The alining bar 11 contacts with screws 13 (Figures 2 and 5) which may be adjusted to properly position said alining bar relative to the carrier 8.

The other alining bar 12 is engaged by horizontal rods 14 (Figures 2 and 5) slidable in the carrier 8 and contacting with eccentrics 15 keyed to a shaft 16 which lies parallel with the guide rib 9. The eccentrics 15 are confined between lugs 17 on the carrier 8 so as to move with the carrier, said lugs being slidable on the shaft 16. The shaft can be turned to impart a slight longitudinal movement to the rods 14, thereby clamping the carrier 8 to the straight face at the lower margin of the guide rib 9, and as will be hereafter described, this clamping action accurately locates the abutment face 6 in a line parallel with the cutter 2.

The means for actuating the shaft 16, to clamp the carrier to the alining guide 9 comprises a hand lever 18 (Figures 1 and 4) fulcrumed at 19 and connected by means of a link 20 to an arm 21 on the shaft 16. This hand lever 18 is movable in opposite directions to impart corresponding movements to the shaft 16 on which the eccentrics 15 are mounted, so the lever can be easily operated to clamp and release the carrier 8. It is not necessary to lock the lever 18, for the motion of the rods 14 is not very great, and the friction between these rods and the eccentrics 15 is sufficient to lock the carrier when the bars 11 and 12 are clamped to the guide 9.

The means for securing the carrier to the abutment member 5 comprises a pivot 23 (Figures 1, 2 and 3) connecting the abutment member to the carrier, and a locking rod 24 passing through a relatively large hole 25 in the abutment member 5, said rod 24 being screwed into the carrier 8 (Fig. 3) and provided with a head which engages the abutment member 5 to prevent accidental displacement of the abutment member relative to the carrier. However, the abutment member 5 can be adjusted on the pivot 23 to accurately locate its abutment face 6 in a predetermined position relative to the cutter.

The means for making the adjustment comprises a lug 26 (Figures 1, 2, 3 and 6) projecting upwardly from the carrier 8 and extending through a slot 27 in the table 1, and horizontal screws 28 mounted in lugs 29 on the abutment member 5. The screws 28 engage opposite sides of the lug 26, so they can be adjusted to change the location of the abutment face 6, and after such adjustment the vertical screw 24 is tightened to prevent accidental displacement.

The means for shifting the carrier 8, to move the abutment member 5 toward and away from the cutter, comprises a sprocket chain 30 passing around sprocket wheels 31 at opposite ends of the table 1. This chain is shown by a dotted line in Fig. 1 and by full lines in the other views of the drawings. The ends of the sprocket chain are secured to the carrier 8 by means of bolts 32, as shown in Fig. 4. A hand wheel 33 (Figures 1 and 4) is secured to one of the sprocket wheels 31 for the purpose of moving the chain 30, thereby adjusting the carrier 8 and the abutment member 5 which is secured to said carrier.

In assembling the machine the cutter 2 is accurately located in a line at a right angle to the finished lower margin of the guide rib 9. The hand lever 18 is operated to clamp the carrier 8 to this lower margin. The screws 28 are then adjusted to accurately locate the abutment face 6 in a line parallel with the cutter.

In using the machine, the hand wheel 33 is turned to adjust the abutment member 5 toward and away from the cutter, and to make this adjustment the abutment member must be loosely secured to the guide 9. However, after the abutment member has been positioned by the hand wheel 33, the lever 18 is actuated to clamp the carrier 8 to the accurately finished lower margin of the guide 9, and this operation not only locks the abutment to prevent displacement when a pile of sheets is pushed against the abutment face 6, but it also accurately locates said abutment face in a line parallel with the cutter. This eliminates the inaccuracies heretofore incurred by the looseness which is necessary to permit adjustment of the gauge member.

I claim:

1. A cutting machine provided with a cutter, an adjustable gauge comprising an abutment member having an abutment face adapted to lie parallel with said cutter, a carrier to which said abutment member is pivoted so as to permit adjustment of said abutment member relative to said carrier, means to prevent displacement of said abutment member relative to said carrier, a guide for said carrier, said guide having a straight face at a right angle to said cutter, said carrier having an alining member adapted to engage said straight face to accurately locate said abutment face in a line parallel with said cutter, and operating means including an eccentric whereby said alining member is forced into frictional engagement with said straight face.

2. A cutting machine provided with a cutter, an adjustable gauge having an abutment face to contact with the material to be cut, said gauge being movable toward and away from said cutter, said abutment face being adapted to lie parallel with said cutter, an alining member having a straight face at a right angle to said cutter, and locking means including a shifter whereby a portion of said gauge is shifted and then detachably locked onto said straight face to accurately locate said abutment face in a line parallel with said cutter during the cutting operation, said locking means being provided with an operating member whereby motion is transmitted to said shifter.

3. A cutting machine provided with a cutter, an adjustable gauge having an abutment face to contact with the material to be cut, said gauge being movable toward and away from said cutter, said abutment face being adapted to lie parallel with said cutter, an alining member having a straight face at a right angle to said cutter, and locking means including a shifter whereby a portion of said gauge is shifted and then detachably locked onto said straight face to accurately locate said abutment face in a line parallel with said cutter during the cutting operation, said shifter being in the form of an eccentric provided with an operating handle from which motion is transmitted to said gauge.

BENJAMIN F. BERRY.